(12) United States Patent
Liu et al.

(10) Patent No.: US 11,204,603 B2
(45) Date of Patent: Dec. 21, 2021

(54) TERMINAL INSERTION QUALITY MONITORING SYSTEM

(71) Applicants: Tyco Electronics (Shanghai) Co. Ltd., Shanghai (CN); TE Connectivity Corporation, Berwyn, PA (US)

(72) Inventors: Hongtao Liu, Shanghai (CN); Dandan Zhang, Shanghai (CN); Roberto Francisco-Yi Lu, Bellevue, WA (US); Zongjie Tao, Shanghai (CN); Changjun Wang, Shanghai (CN); Lei Zhou, Shanghai (CN); Lvhai Hu, Shanghai (CN)

(73) Assignees: TE Connectivity Corporation, Berwyn, PA (US); Tyco Electronics (Shanghai) Co. Ltd., Shanghai (CN)

( * ) Notice: Subject to any disclaimer, the term of this patent is extended or adjusted under 35 U.S.C. 154(b) by 112 days.

(21) Appl. No.: 16/568,320

(22) Filed: Sep. 12, 2019

(65) Prior Publication Data
US 2020/0081429 A1    Mar. 12, 2020

(30) Foreign Application Priority Data
Sep. 12, 2018   (CN) .......................... 201811061760.8

(51) Int. Cl.
*G05B 23/02* (2006.01)
*H01R 13/58* (2006.01)
(Continued)

(52) U.S. Cl.
CPC .......... *G05B 23/0294* (2013.01); *G01P 1/023* (2013.01); *G06K 9/628* (2013.01); *H01R 13/5841* (2013.01)

(58) Field of Classification Search
CPC .......... G05B 2219/45203; G05B 2219/50358; G05B 23/0294; G06N 20/00;
(Continued)

(56) References Cited

U.S. PATENT DOCUMENTS

2014/0279443 A1* 9/2014 Neeley ...................... G01D 7/00
705/39
2014/0309752 A1* 10/2014 Yuzurihara ............ G05B 15/02
700/13

(Continued)

FOREIGN PATENT DOCUMENTS

| CN | 2222404 Y | 3/1996 |
|---|---|---|
| CN | 105514754 A | 4/2016 |
| CN | 206898732 U | 1/2018 |

*Primary Examiner* — Darrin D Dunn
(74) *Attorney, Agent, or Firm* — Barley Snyder

(57) ABSTRACT

A terminal insertion quality monitoring system includes an acceleration sensor disposed on a gripper of a terminal insertion equipment and configured to detect a dynamic acceleration of the gripper while using the gripper to insert a terminal into a housing, a control parameter acquisition device configured to acquire a plurality of control parameters of the terminal insertion equipment while inserting the terminal into the housing, and an artificial intelligence system adapted to classify the detected dynamic acceleration and the acquired control parameters into a plurality of different insertion modes by analyzing and calculating the detected dynamic acceleration and the acquired control parameters. The different insertion modes have a plurality of different grades of terminal insertion quality. The artificial intelligence system is configured to monitor a terminal insertion quality of the terminal according to the insertion mode to which the detected dynamic acceleration and the acquired control parameters correspond.

18 Claims, 3 Drawing Sheets

(51) Int. Cl.
*G01P 1/02* (2006.01)
*G06K 9/62* (2006.01)

(58) Field of Classification Search
CPC ..... H01R 13/5841; H01R 43/20; G01P 1/023; G06K 9/628; B25J 13/088; G01M 13/00
See application file for complete search history.

(56) References Cited

U.S. PATENT DOCUMENTS

| | | | |
|---|---|---|---|
| 2017/0028521 A1* | 2/2017 | Yamamoto | B25B 23/1456 |
| 2018/0107947 A1* | 4/2018 | Ogawa | B23Q 15/18 |
| 2018/0222057 A1* | 8/2018 | Mizobe | B25J 9/1697 |
| 2020/0230884 A1* | 7/2020 | Buggenthin | B22F 10/10 |

* cited by examiner

TERMINAL INSERTION QUALITY MONITORING SYSTEM

CROSS-REFERENCE TO RELATED APPLICATION

This application claims the benefit of the filing date under 35 U.S.C. § 119(a)-(d) of Chinese Patent Application No. 201811061760.8, filed on Sep. 12, 2018.

FIELD OF THE INVENTION

The present invention relates to a monitoring system and, more particularly, to a monitoring system monitoring an insertion quality of a terminal.

BACKGROUND

A connector generally includes a terminal and a housing in which the terminal is inserted. In order to ensure the insertion quality of the terminal, it is necessary to monitor the insertion quality of the terminal. There are generally two schemes for monitoring insertion quality: one scheme is to detect the maximum insertion force during the terminal insertion process by a force sensor, and if the maximum insertion force does not exceed a preset threshold value, it is determined that the terminal insertion quality is normal; the other scheme is to take an image of the terminal by a camera and analyze from the image whether an error between an insertion position and a predetermined position of the terminal is within a tolerance range, and if it is within the tolerance range, it is determined that the terminal insertion quality is normal.

Neither of the above schemes, however, can comprehensively reflect the whole insertion process of the terminal, leading to misjudgment and a failure to improve manufacturing quality.

SUMMARY

A terminal insertion quality monitoring system includes an acceleration sensor disposed on a gripper of a terminal insertion equipment and configured to detect a dynamic acceleration of the gripper while using the gripper to insert a terminal into a housing, a control parameter acquisition device configured to acquire a plurality of control parameters of the terminal insertion equipment while inserting the terminal into the housing, and an artificial intelligence system adapted to classify the detected dynamic acceleration and the acquired control parameters into a plurality of different insertion modes by analyzing and calculating the detected dynamic acceleration and the acquired control parameters. The different insertion modes have a plurality of different grades of terminal insertion quality. The artificial intelligence system is configured to monitor a terminal insertion quality of the terminal according to the insertion mode to which the detected dynamic acceleration and the acquired control parameters correspond.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
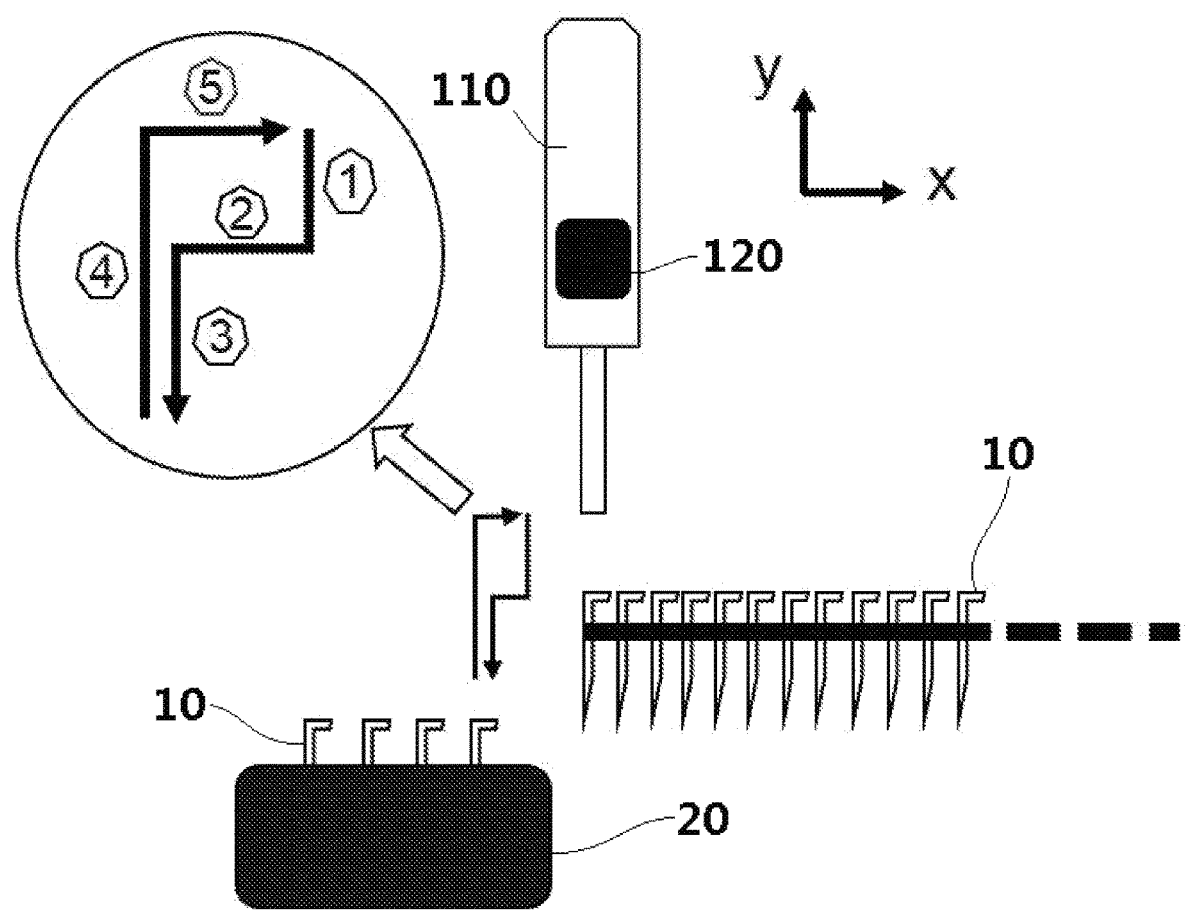
FIG. 1 is a schematic view of inserting a terminal into a housing according to an embodiment.

The present invention is further described in detail in the following embodiments with reference to the accompanying drawings. In the specification, the same or similar reference numerals denote the same or similar components. The following description of the embodiments of the present disclosure with reference to the accompanying drawings is intended to explain the general inventive concept of the disclosure and should not be construed as a limitation of the present disclosure.

In addition, in the following detailed description, for purposes of explanation, numerous specific details are set forth in order to provide a thorough understanding of the embodiments of the disclosure. However, one or more embodiments may be practiced without these specific details. In other instances, well-known structures and devices are shown in schematic form in order to simplify the drawing.

A terminal 10, as shown in FIG. 1, is cut from a terminal strip having a plurality of terminals 10, and the cut terminal 10 is then gripped and inserted into a housing 20 by a gripper 110 of a terminal insertion equipment 100. In an embodiment, the gripper 110 and the terminal insertion equipment 100 is a robot. The terminal 10 inserted into the housing 20 forms an electrical connector.

The terminal 10, as shown in FIG. 1, needs to be moved in a horizontal direction X and a vertical direction Y during the insertion process. In the shown embodiment, the terminal 10 needs to be moved along a path of ①→②→③→④→⑤ shown in FIG. 1 during the insertion process.

In order to monitor the entire process of inserting the terminal 10 into the housing 20, as shown in FIG. 1, an acceleration sensor 120 is provided on the gripper 110. The acceleration sensor 120 is configured to detect the dynamic accelerations of the gripper 110 during inserting the terminal 10 into the housing 20.

Figure 2:
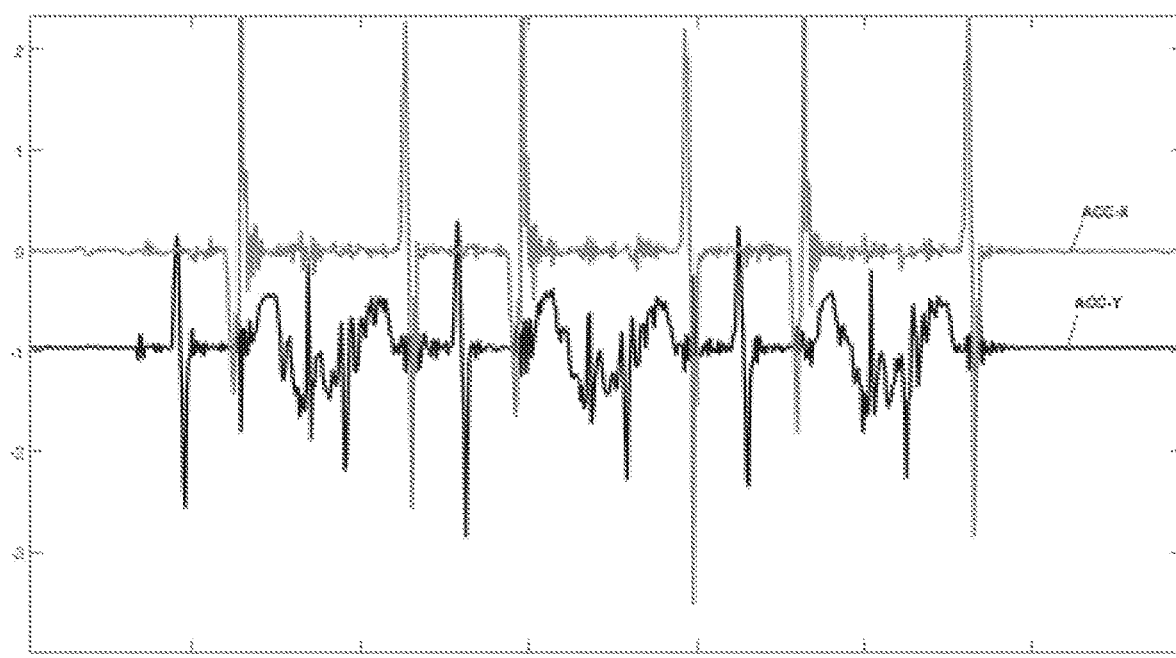
FIG. 2 is a graph of a dynamic acceleration detected by an acceleration sensor of FIG. 1.

Accelerations detected by the acceleration sensor 120 are shown in FIG. 2. Because the terminal 10 needs to be moved in the horizontal direction X and the vertical direction Y, the dynamic accelerations in the graph of FIG. 2 include a horizontal dynamic acceleration ACC-X and a vertical dynamic acceleration ACC-Y.

Figure 3:
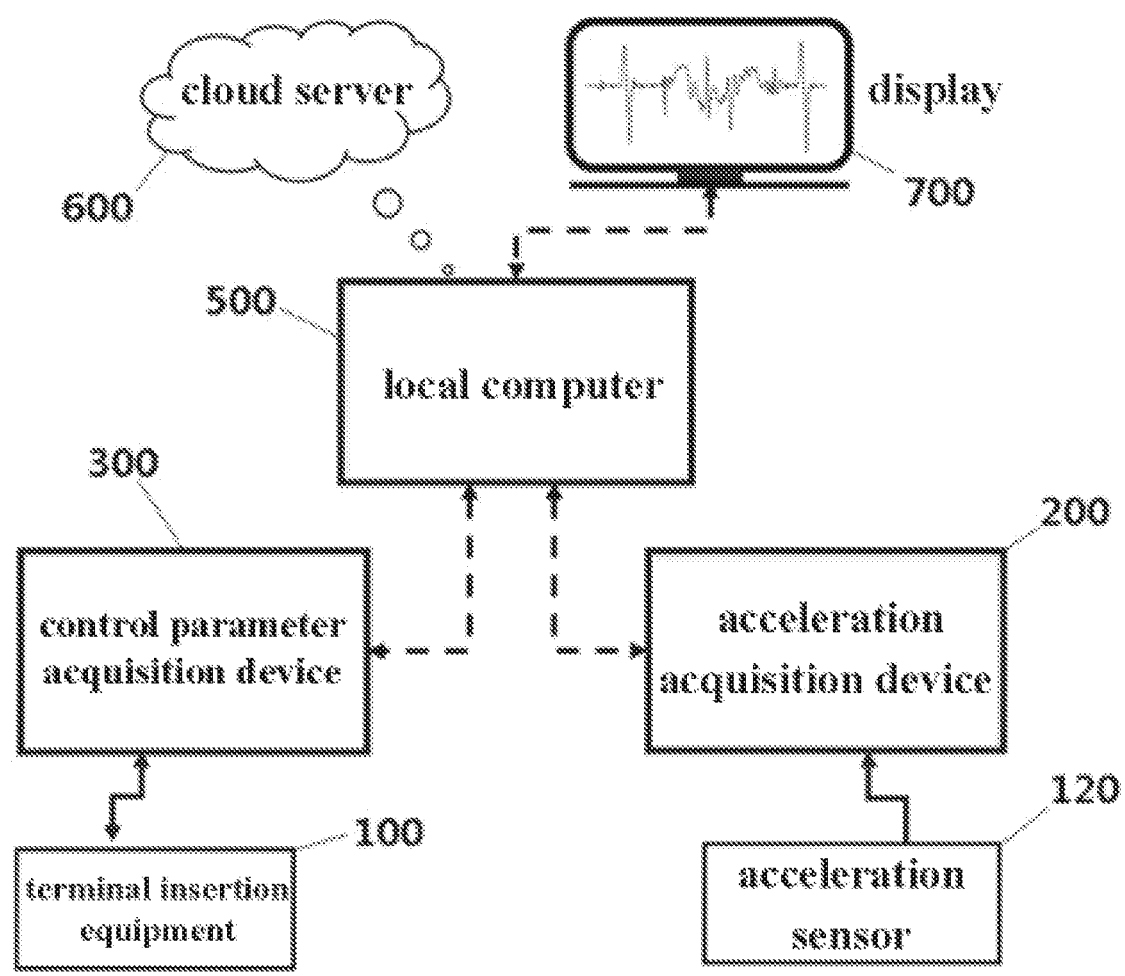
FIG. 3 is a schematic view of a terminal insertion quality monitoring system according to an embodiment.

A terminal insertion quality monitoring system, shown in FIG. 3, comprises the acceleration sensor 120, a control parameter acquisition device 300 and an artificial intelligence system.

The acceleration sensor 120 is provided on the gripper 110 for gripping the terminal 10, and is configured to detect the dynamic accelerations of the gripper 110 during inserting the terminal 10 into the housing 20. The control parameter acquisition device 300 may be directly provided on a control device of the terminal insertion equipment 100 and configured to acquire a plurality of control parameters of the terminal insertion equipment 100 while inserting the terminal 10 into the housing 20.

The artificial intelligence system may be run in the cloud server 600, shown in FIG. 3. The artificial intelligence system is adapted to classify the detected dynamic accelerations and the acquired control parameters into a plurality of different insertion modes by analyzing and calculating the detected dynamic accelerations and the acquired control parameters. In an embodiment, the different insertion modes have different grades of terminal insertion quality, and thus the artificial intelligence system is adapted to monitor the terminal insertion quality of the current terminal 10 according to the insertion mode to which the currently detected dynamic accelerations and the currently acquired control parameters correspond.

In an embodiment, the plurality of different insertion modes comprise a first insertion mode indicating that the terminal insertion quality is excellent, a second insertion mode indicating that the terminal insertion quality is medium, and a third insertion mode indicating that the terminal insertion quality is inferior. If the artificial intelligence system determines that the currently detected dynamic accelerations and the currently acquired control parameters belong to the third insertion mode by analysis and calculation, the artificial intelligence system may issue a warning message that the terminal insertion quality of the current terminal is unqualified.

The terminal insertion quality monitoring system, as shown in FIG. 3, comprises an acceleration acquisition device 200 configured to acquire the dynamic accelerations detected by the acceleration sensor 120. Because the artificial intelligence system is run in the cloud server 600, the detected dynamic accelerations and the acquired control parameters are sent to the cloud server 600.

The terminal insertion quality monitoring system, as shown in FIG. 3, comprises a local computer 500 through which the acceleration acquisition device 200 and the control parameter acquisition device 300 communicate with the cloud server 600. The acceleration acquisition device 200 is configured to send the acquired dynamic accelerations to the local computer 500, and the local computer 500 is configured to store the received dynamic accelerations at a local database and send the received dynamic accelerations to the cloud server 600. The control parameter acquisition device 300 is configured to send the acquired control parameters to the local computer 500, and the local computer 500 is configured to store the received control parameters in the local database and send the received control parameters to the cloud server 600.

The artificial intelligence system is configured to optimize the control parameters of an insertion mode having the highest-grade terminal insertion quality to obtain the optimized control parameters, and send the optimized control parameters to a controller of the terminal insertion equipment 100, so that the terminal insertion equipment 100 is controlled with the optimized control parameters. In this way, the quality of insertion of the terminal 10 into the housing 20 is improved. Furthermore, as the number of the inserted terminals is increased, the terminal insertion quality of the terminal 10 will be higher since the number of sample data regarding dynamic acceleration and control parameters for learning and training of the artificial intelligence system will be higher.

The terminal insertion quality monitoring system, as shown in FIG. 3, comprises a display 700 communicating with the local computer 500. The local computer 500 is configured to send the received dynamic accelerations to the display 700. The display 700 may display the dynamic accelerations. Thus, the terminal insertion quality of the current terminal 10 may be monitored on-site according to the displayed dynamic accelerations. Because the dynamic accelerations include a horizontal dynamic acceleration ACC-X and a vertical dynamic acceleration ACC-Y, the display 700 may simultaneously display the horizontal dynamic acceleration ACC-X and the vertical dynamic acceleration ACC-Y. In this way, not only vertical insertion movement but also horizontal insertion movement may be monitored.

Those skilled in the art will appreciate that the above-described embodiments are illustrative and can be modified, and that the structures described in the various embodiments can be freely combined without conflict in structure or principle.

Although the present disclosure has been described with reference to the accompanying drawings, the embodiments disclosed in the drawings are intended to be an illustrative explanation of embodiments of the disclosure, and should not be construed as limiting the disclosure.

Although a few embodiments of the inventive concept have been shown and described, it would be appreciated by those skilled in the art that changes may be made in these embodiments without departing from the principles and spirit of the present general inventive concept, and the scope of the present disclosure is defined by the claims and their equivalents.

What is claimed is:

1. A terminal insertion quality monitoring system comprising:
    an acceleration sensor disposed on a gripper of a terminal insertion equipment and configured to detect a dynamic acceleration of the gripper while using the gripper to insert a terminal into a housing;
    a control parameter acquisition program adapted to acquire a plurality of control parameters of the terminal insertion equipment while inserting the terminal into the housing;
    an artificial intelligence program running on a server and adapted to:
        classify the detected dynamic acceleration and the acquired control parameters into a plurality of different insertion modes by analyzing and calculating the detected dynamic acceleration and the acquired control parameters, the different insertion modes have a plurality of different grades of terminal insertion quality;
        monitor a terminal insertion quality of the terminal according to the insertion mode to which the detected dynamic acceleration and the acquired control parameters correspond; and
        optimize the control parameters of an insertion mode corresponding to a desired terminal insertion quality to obtain a plurality of optimized control parameters, wherein a controller inserts a terminal using the optimized control parameters; and
    a display adapted to display the dynamic acceleration.

2. The terminal insertion quality monitoring system of claim 1, wherein the plurality of different insertion modes include a first insertion mode indicating that the terminal insertion quality is of a first acceptable degree, a second insertion mode indicating that the terminal insertion quality is of a second acceptable degree, and a third insertion mode indicating that the terminal insertion quality is unqualified.

3. The terminal insertion quality monitoring system of claim 2, wherein, when the artificial intelligence program determines that the detected dynamic acceleration and the acquired control parameters correspond to the third insertion mode, the artificial intelligence program issues a warning message that the terminal insertion quality of the terminal is unqualified.

4. The terminal insertion quality monitoring system of claim 1, further comprising an acceleration acquisition device configured to acquire the dynamic acceleration detected by the acceleration sensor.

5. The terminal insertion quality monitoring system of claim 4, wherein the artificial intelligence program is in a cloud server.

6. The terminal insertion quality monitoring system of claim 5, wherein the dynamic acceleration and the control parameters are sent to the cloud server.

7. The terminal insertion quality monitoring system of claim 6, further comprising a local computer through which the acceleration acquisition device and the control parameter acquisition program communicate with the cloud server.

8. The terminal insertion quality monitoring system of claim 7, wherein the acceleration acquisition device is configured to send the dynamic acceleration to the local computer.

9. The terminal insertion quality monitoring system of claim 8, wherein the local computer is configured to store the dynamic acceleration in a local database and send the dynamic acceleration to the cloud server.

10. The terminal insertion quality monitoring system of claim 9, wherein the control parameter acquisition program is configured to send the control parameters to the local computer.

11. The terminal insertion quality monitoring system of claim 10, wherein the local computer is configured to store the control parameters in the local database and send the control parameters to the cloud server.

12. The terminal insertion quality monitoring system of claim 1, wherein the dynamic acceleration includes a horizontal dynamic acceleration and a vertical dynamic acceleration, the display is adapted to simultaneously display the horizontal dynamic acceleration and the vertical dynamic acceleration.

13. The terminal insertion quality monitoring system of claim 1, wherein the control parameter acquisition device is directly provided on the terminal insertion equipment.

14. The terminal insertion quality monitoring system of claim 1, wherein the terminal insertion quality corresponds to the detected dynamic acceleration of the gripper.

15. A terminal insertion quality monitoring system comprising:
a plurality of electrical terminals;
a housing for receiving the plurality of electrical terminals;
a terminal insertion device including a gripper for gripping one of the plurality of electrical terminals and inserting the terminal into the housing, the gripper moved in a horizontal and vertical direction during a terminal insertion process;
an acceleration sensor disposed on the gripper of the terminal insertion device and configured to detect a dynamic acceleration of the gripper in the horizontal and vertical directions during the terminal insertion process;
a control parameter acquisition program adapted to acquire a plurality of control parameters of the terminal insertion device while inserting the terminal into the housing; and
an artificial intelligence program adapted to:
classify the detected dynamic acceleration and the acquired control parameters into a plurality of different insertion modes by analyzing and calculating the detected dynamic acceleration and the acquired control parameters, the different insertion modes have a plurality of different grades of terminal insertion quality;
monitor a terminal insertion quality of the terminal according to the insertion mode to which the detected dynamic acceleration and the acquired control parameters correspond; and
optimize the control parameters of an insertion mode corresponding to a desired terminal insertion quality to obtain a plurality of optimized control parameters, wherein a controller inserts a terminal using the optimized control parameters.

16. The terminal insertion quality monitoring system of claim 15, further comprising a display adapted to display the dynamic acceleration.

17. The terminal insertion quality monitoring system of claim 15, wherein the dynamic acceleration includes a horizontal dynamic acceleration and a vertical dynamic acceleration, the display is adapted to simultaneously display the horizontal dynamic acceleration and the vertical dynamic acceleration.

18. The terminal insertion quality monitoring system of claim 15, wherein the terminal insertion quality corresponds to the detected dynamic acceleration of the gripper.

* * * * *